Patented Dec. 5, 1950

2,532,941

UNITED STATES PATENT OFFICE 2,532,941

PROCESS TO PROVIDE PLASTIC ARTICLES WITH PRINTING

Leopold Rado, London, England

No Drawing. Application August 5, 1947, Serial No. 766,333. In Great Britain October 1, 1943

4 Claims. (Cl. 154—99)

This application is a continuation-in-part of my co-pending application entitled, Process to Provide Plastic Articles with Printing, Serial No. 521,751, filed February 8, 1944, now abandoned, and relates to improvements in the process with printings and has for an object to provide a process of transfer and printing wherein the colors being transferred are easily and positively controlled. Heretofore the mixing of different colored powders did not assure a predetermined positive coloring.

Another object of the invention is to eliminate the engraving of mold plates required for the printing process as this has been a matter of considerable expense.

A further object of the invention is to eliminate the use of adhesives when the print is transferred from the bearer to the plastic and the bearer removed.

A still further object of this invention is to provide a finished print on a plastic article which cannot be damaged because it is embedded in the plastic itself.

A still further object of this invention is to provide a transfer process whereby it is possible to print on plastics without the necessity of special inks.

A still further object of the invention is to eliminate the use of special printing equipment.

With the foregoing and other objects in view, the invention will be more fully described hereinafter and more particularly pointed out in the appended claims.

In accordance with the present invention a print to be transferred to a plastic base is made on a bearer of fibrous material, such as paper, and laid with the printed side to the plastic base, while the plastic base is in a hot and softened state, and is pressed to the surface of the plastic base whereon the print side of the bearer will adhere to the plastic base and after cooling and solidification of the plastic base the unembedded fibres of the bearer are removed, for example by moistening or dipping in water, whereon the fibres will loosen.

The term bearer as used in this specification refers to a fibrous carrier upon which an inked surface printing may be made which surface printing will be partially absorbed in the surface fibers.

As the bearer is pressed into the soft, plastic surface, it will in accordance with the thickness of the bearer, lie correspondingly deep in the plastic, and on removal of the bearer an impression is left behind which can act as a protection for the transferred print.

The fibres of the bearer leave a mark on the plastic surface in accordance with their texture, i. e. fibres of finer texture leave a finer impression. The roughness of the surface of the plastic, produced by the pressed in fibres of the bearer, gives the print an advantageous matt appearance.

The pressing of the bearer to the hot, soft, and tacky surface results in the surface fibres of the bearer becoming embedded in the plastic, and during the process of removal of the print bearer, the surface fibres of the bearer, which are colored by the printing ink, are embedded in, and adhere to, the plastic surface and cannot be removed. Only the unembedded fibres of the bearer are removable. The surface fibres of the print are fully or partially embedded in the plastic, and the free ends of the partially embedded fibres are not colored with printing ink and protrude like fine hairs from the plastic surface. These fine protruding hairs give a faintly misty appearance to the transferred print. This, however can be overcome by treating these fine protruding hairs with transparent lacquer or oily substances which will penetrate and fill out the capillaries of the fibres thus making them transparent. The so-treated transferred printing has a matt and silky surface. The print surface can also be lacquered over and will have therefrom an enamel-like appearance with the great advantage that the lacquer will anchor itself to the protruding fibres and is thus more desirable than the lacquering of ordinary plastic surfaces.

Through experiment I have found that any ink will function as a color for the print transfer and does not have to be limited to a thermoplastic or thermosetting ink.

The above described process can be carried out on both thermoplastic, and thermosetting plastics, but it must be observed that in the use of thermosetting plastics such as resins of phenol-aldehyde and urea-aldehyde, the transfer can be made only during the forming process before curing while the thermosetting plastic is still in a soft, tacky condition. If the curing is completed the transfer will not have the required success; however, the case is otherwise in the use of thermoplastics as this type of plastic can be resoftened again under heat.

The term "printing" as used in connection with the present invention is to be understood as the transfer of printings and colorings of any kind made by any method, whether by a printing machine, by spraying with an air gun, by a brush, pen, pencil or any other coloring method.

Prints to be transferred must be in reverse on the bearer, which in the case of lettering is essential.

My process may be practiced according to the following examples:

Example I

The print to be transferred is printed on a bearer of fibrous material such as sized paper or unsized paper. The plastic base to which the print is to be transferred is of a thermoplastic resin such as cellulose acetate. The print on the bearer is placed face down against the plastic base while the thermoplastic base is in a soft, hot, and tacky state. A pressure of 50 lbs. per square inch is applied for a period of 5 seconds after which the bearer is stripped from the plastic base and the surface fibres remaining on the print are covered with a cellulose lacquer to render them transparent.

Example II

When it is desired to cause the print transfer during the molding process the following is carried out: The mold is heated to a temperature of 280–320° F. and filled with a thermosetting powder of urea formaldehyde and under pressure of 1 ton per square inch for 25–30 seconds the article is formed, after which pressure is released, the mold is opened and the bearer carrying the print is placed in the mold with the print against the plastic surface and pressure of 1 ton per square inch is applied to the print carrier until such time as the article in the mold is fully cured, whereafter the formed article is removed from the mold and the unembedded fibres are removed from the article by moistening. The surface fibres remaining partially embedded in the plastic surface are then treated with an oily substance, such as olive oil, which fills out the capillaries of the partially embedded fibres and making the same transparent.

While I have disclosed herein the best form of the invention known to me at the present time, I desire it to be understood that I reserve the right to make changes and modifications in the herein described embodiment of the invention provided such changes fall within the scope of the following claims.

What is claimed is:

1. The herein described process consisting in providing plastic surfaces with printings, laying a fibrous carrier containing a design thereon and partially embedded in the surface fibers thereof to be transferred against the plastic surface while the plastic is in a soft, hot and tacky condition, pressing the carrier and the plastic together embedding the fibers of the carrier into the plastic and effecting a transfer of the design thereto, subsequently cooling the plastic and removing the unembedded surface fibers of the print carrier.

2. The herein described process consisting in providing plastic surfaces with printings by laying a fibrous bearer of paper carrying thereon a design partially embedded in the surface fibers thereof to be transferred against the plastic surface while the same is in a soft, hot and tacky condition, pressing the bearer and plastic together embedding the fibers of the bearer into the plastic and effecting the transfer of the design thereto, subsequently cooling the plastic and removing the bearer therefrom and treating the remaining partially embedded surface fibers with a substance filling the capillaries thereof making the same transparent.

3. The process as claimed in claim 2 characterized by the fact that the treating substance of the partially unembedded fibres is an oily substance.

4. The process as claimed in claim 2 wherein the partially unembedded fibres are covered with a clear lacquer.

LEOPOLD RADO.

REFERENCES CITED

The following references are of record in the file of this patent:

UNITED STATES PATENTS

| Number | Name | Date |
|---|---|---|
| 1,883,854 | Michael | Oct. 18, 1932 |

FOREIGN PATENTS

| Number | Country | Date |
|---|---|---|
| 562,573 | Great Britain | July 6, 1944 |